H. IVERSEN.

STAIR-ROD.

No. 6,819.

Reissued Dec. 21, 1875.

Witnesses

Chas H. Smith

Harold Sewell

Inventor

Hans Iversen per Lemuel W. Serrell

Atty.

N. PETERS, PHOTO-LITHOGRAPHER, WASHINGTON, D. C.

UNITED STATES PATENT OFFICE.

HANS IVERSEN, OF NEW YORK, N. Y.

IMPROVEMENT IN STAIR-RODS.

Specification forming part of Letters Patent No. 155,028, dated September 15, 1874; reissue No. 6,819, dated December 21, 1875; application filed June 21, 1875.

*To all whom it may concern:*

Be it known that I, HANS IVERSEN, of the city and State of New York, have invented an Improvement in Stair-Rods, of which the following is a specification:

Stair-rods have been made with an iron band, over which thin brass or German silver has been drawn and the rods bent to shape. Triangular rods of wood or metal have been used.

My improvement is especially intended for stairs where a wide carpet is used, and there is not sufficient width on the stairs at the sides of the carpet to allow for the ordinary end loop and endwise movement in first one direction and then the other as the rod is inserted into place.

I employ a metal rod that is hollow, and generally of a triangular form, the face being of one strip of metal, having its edges folded back, interlocked with the edges of the rear strip; and into the ends of this hollow rod bolts are inserted, and either or both bolts are actuated by a knob or projection at the surface of the rod, and said bolts are both moved, or only one, so as to bolt the rod either to the casing at the sides of the stair, or to eyes specially provided, so that the rod can be nearly as long as the width of the stair.

Figure 1:
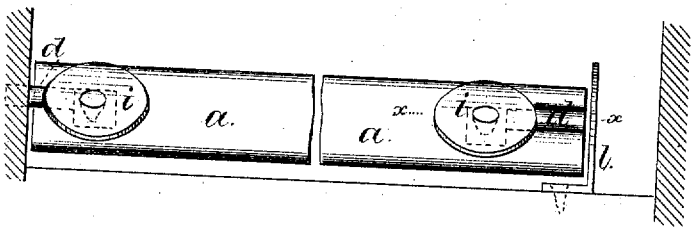
Figure 2:
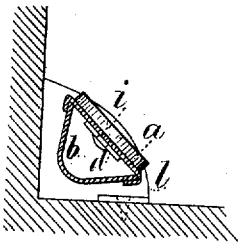
Figure 4:
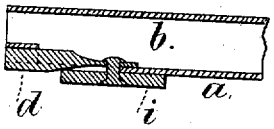
Figure 3:
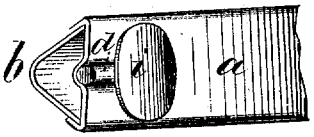

In the drawings, Figure 1 is an elevation of the ends of the rod. Fig. 2 is a cross-section of the bar. Fig. 3 is an end view, and Fig. 4 is a horizontal section at the line *x*.

The surface of the rod is more or less ornamental. I have shown the metal face *a* as flat. The edges of this metal face *a* are turned back, and retain the back plate *b*, such back plate being V-formed, and of less expensive metal than the face of the rod. This construction renders the rod very strong and cheap. At the same time it is hollow, and receives the bolts at the ends. The bolts *d* are made with a broad body at the back of the plate *a*; and near the ends of the rods there is a mortise in the plate *a*, and said plate is recessed back between such mortise and the end, so that the plate *a* comes behind the bolt; but the broad body is behind the plate *a* and the mortise therein, through which is the rivet that connects the bolt to its actuating button or disk *i*, that is more or less ornamental.

By this construction the bolt *d* can be projected beyond the end of the rod into the casing or wainscoting, and the rod can be nearly as long as the width of the stair.

When desired, an end piece can be attached in the angle between the tread and riser of the stair, into a hole in which the bolts can be projected, as seen at *l*.

It will generally be best to make the bolts at each end to move; but, if desired, the bolt at one end may be stationary, so as to be inserted into the hole in the casing as the rod is put into place, after which the moving bolt at the other end is projected into the hole prepared for its reception.

I claim as my invention—

1. The hollow stair-rod, having a face, *a*, that is formed of a metal strip folded backwardly, and the edges connected by the metal back *b*, substantially as set forth.

2. The bolt *d* within the end of the stair-rod, and a button-head, *i*, outside the rod, connected to the bolt by a rivet passing through a mortise in the bolt, substantially as set forth.

Dated this 15th day of June, 1875.

H. IVERSEN.

Witnesses:
GEO. D. WALKER,
CHAS. H. SMITH.